United States Patent [19]

Dean

[11] Patent Number: 4,542,187

[45] Date of Patent: Sep. 17, 1985

[54] POLYARYLATE RESIN CONTAINING COMPOSITION AND METHOD

[75] Inventor: Barry D. Dean, Broomall, Pa.

[73] Assignee: Atlantic Richfield Company, Los Angeles, Calif.

[21] Appl. No.: 610,065

[22] Filed: May 14, 1984

[51] Int. Cl.4 .................. C08L 67/02; C08L 25/18; C08L 33/24
[52] U.S. Cl. .................................. 525/132; 525/151
[58] Field of Search .............................. 525/132, 175

[56] References Cited

U.S. PATENT DOCUMENTS

| | | | |
|---|---|---|---|
| 3,585,256 | 6/1971 | Fuest | 525/175 |
| 3,792,118 | 2/1974 | Kishikawa | 525/132 |
| 4,250,279 | 2/1981 | Robeson | 525/425 |
| 4,259,458 | 3/1981 | Robeson | 525/132 |
| 4,286,075 | 8/1981 | Robeson | 525/439 |
| 4,324,869 | 4/1982 | Robeson | 525/132 |
| 4,327,012 | 4/1982 | Salee | 525/132 |
| 4,348,500 | 9/1982 | Robeson | 525/438 |
| 4,388,446 | 6/1983 | Hornbaker | 525/175 |

*Primary Examiner*—John C. Bleutge
*Assistant Examiner*—Patricia Short
*Attorney, Agent, or Firm*—Dennis M. Kozak

[57] ABSTRACT

Moldable polymer compositions comprising a polyarylate resin and a copolymer containing recurring units of a vinyl aromatic monomer and recurring units of a maleimide monomer are disclosed.

18 Claims, No Drawings

POLYARYLATE RESIN CONTAINING COMPOSITION AND METHOD

This invention teaches a moldable polyblend of a polyarylate derived from a dihydric phenol and a mixture of isophthalic acid and terephtalic acid with a copolymer comprising a vinyl aromatic monomer and a maleimide monomer. The copolymer comprised of a vinyl aromatic monomer and maleimide monomer serves to reduce the melt viscosity of the polyarylate upon molding, as well as increase the hydrolytic stability of the molded polyarylate resin.

Polymer compositions containing polyarylate resins have been proposed in the literature. U.S. Pat. No. 4,250,279 teaches a polyblend of polyarylate with polyethermide for improved environmental stress crack resistance. U.S. Pat. No. 4,286,075 teaches a polyblend comprising polyarylate, polycarbonate and ABS. U.S. Pat. No. 4,327,012 teaches a polyblend of polyarylate and SAN for improved hydrolytic stability, while U.S. Pat. No. 4,324,869 teaches an impact modified polyarylate polyblend with ABS and ethylene/alkyl acrylate copolymer. U.S. Pat. No. 4,348,500 demonstrates a molding composition comprised of polyarylate, polyester and poly(expoxides).

The polyarylate resin suitable for use in this invention is derived from a dihydric phenol and a mixture of isophthalic and terephthalic acids. Polyarylate resins referred to in this invention are described by U.S. Pat. No. 4,129,595 and 4,229,565 the teachings of which are incorporated herein by reference thereto.

According to this invention, there is provided a moldable polymer composition comprising from about 99.5 to about 1% by weight of a polyarylate resin and from about 0.5 to about 99% by weight of a copolymer containing from about 50 to about 60 mole % recurring units of a vinyl aromatic monomer and from about 40 to about 50 mole % recurring units of a maleimide monomer.

According to this invention, there is also provided a method of producing a molded polymer composition which comprises forming a blend comprising from about 99.5 to about 1% by weight of a polyarylate resin and from about 0.5 to about 99% by weight of a copolymer containing from about 50 to about 60 mole % recurring units of a vinyl aromatic monomer and from about 40 to about 50 mole % recurring units of a maleimide monomer, and molding the resulting blend.

Also, according to this invention, there is provided a method of improving the hydrolytic stability of a polyarylate resin upon molding which comprises incorporating into the polyarylate resin a copolymer containing from about 50 to about 60 mole % recurring units of vinyl aromatic monomer and from about 40 to about 50 mole % recurring units of a maleimide monomer, the copolymer being present in the polyarylate resin in an amount sufficient to improve the hydrolytic stability of the polyarylate resin upon molding.

According to this invention, there is also provided a method of reducing the melt viscosity of a polyarylate resin which comprises incorporating into the polyarylate resin a copolymer containing from about 50 to 60 mole % recurring units of a vinyl aromatic monomer and from about 40 to about 50 mole % recurring units of a maleimide monomer, the copolymer being present in the polyarylate resin in an amount sufficient to improve the hydrolytic stability of the polyarylate resin upon molding.

The property improvements in the molded compositions containing polyarylate resin of this invention are at least in part due to the unexpected thermodynamic miscibility between the polyarylate resin and the vinyl aromatic/maleimide copolymers. Two or more polymers are said to be thermodynamically miscible when the free energy of mixing is negative. And, thermodynamic miscibility is said to exist when a mixture of two or more polymers results in a material exhibiting a single well defined glass transition temperature.

In a preferred embodiment, the polymer compositions of this invention will comprise in weight percent from about 90% to about 99.5% polyarylate resin and from about 0.5 to about 10% vinyl aromatic/maleimide copolymer.

The vinyl aromatic/maleimide copolymer employed in the polymer composition will comprise from about 50 to about 60 mole % vinyl aromatic monomer and from about 40 to about 50 mole % maleimide monomer. The most preferred composition is 50 mole % vinyl aromatic monomer and 50 mole % maleimide monomer. Moreover, the vinyl aromatic/maleimide copolymer should have a peak molecular weight from 50,000 to 500,000; most preferably from 50,000 to 250,000.

Any suitable vinyl aromatic monomer may be employed.

Particularly suitable vinyl aromatic monomers include styrene, p-methylstyrene, vinyl toluene, t-butyl styrene, α-methylstyrene, monobromostyrene, dibromostyrene, tribromostyrene, monochlorstyrene, dichlorostyrene, trichlorostyrene, dimethylstyrene or a mixture of two or more of the above. The vinyl aromatic monomer most preferred is styrene.

Any suitable maleimide monomer may be used. As used herein the term "maleimide monomers" is intended to mean maleimide itself and all suitable N-substituted maleimide monomers.

Suitable maleimide monomers shall mean and include maleimide, N-methymaleimide, N-ethylmaleimide, N-propylmaleimide, N-butylmaleimide, N-phenylmaleimide, N-(p-tolyl)maleimide, N-(2,5-dimethyl) maleimide, N-(2,6,-dimethyl)maleimide, N-(2-chlorophenyl) maleimide, N-(3-chlorphenyl)maleimide, N-(4-chlorophenyl) maleimide, N-(2,3-dichlorophenyl)maleimide, N-(2,4-dichlorophenyl)maleimide, N-(2,5-dichlorophenyl)maleimide, N-(2,5-dichlorophenyl)maleimide, N-(2,5-dichlorophenyl)maleimide, N-(2,6-dichlorophenyl)maleimide, N-(2-bromophenyl)maleimide, N-(3-bromophenyl)maleimide, N-(4-bromophenyl)maleimide, N-(2,3-dibromophenyl)maleimide, N-(2,4-dibromophenyl) maleimide, N-(2,5-dibromophenly)maleimide, N-(2,6-dibromophenyl)maleimide, N-tribromophenylmaleimide or a mixture of two or more of the above. The maleimide most preferred is N-phenylmaleimide.

The vinyl aromatic/maleimide copolymer is prepared in a bulk process, a continuous bulk process, a solution process or a suspension process. The preferred method of preparation is a suspension process.

EXAMPLE 1

This example serves to demonstrate the preparation of a styrene/N-phenylmaleimide copolymer, suitable for use in this invention, by the suspension process.

A citrate bottle was charged with 140 grams of water, 37.6 grams of styrene, 62.4 grams of N-phenylmaleimide, 0.57 grams of t-butylperoctoate, 0.32 grams of t-butyl perbenzoate, 0.0002 grams of sodium bisulfite and 1.8 grams of tricaliumphosphate. The bottle was capped and placed in a oil bath with constant agitation. The bottle was heated to 90° C. for 1.0 hour and then to 140° C. for 3.5 hours. The beads formed were filtered, acidified to pH=1.0 and washed with water. The total weight of the beads recovered was 99.2 grams (99.2% conversion). The copolymer was analyzed and found to contain 5.1% N which corresponds to 63.02 wt. % N-phenylmaleimide (50 mole %). The copolymer exhibited a glass transition temperature of 223° C. by differential scanning calorimetry. The copolymer had a peak molecular weight of 188,000, a weight average molecular weight (Mw) of 298,000 and a number average molecular weight (Mn) of 129,600.

EXAMPLES 2–6

The following set of five examples serves to illustrate the affect of the styrene/N-phenylmaleimide copolymer on the melt flow of the polyarylate resin (Ardel ™ Polyarylate D-100, Union Carbide) when incorporated therein. A control(2), and four blends(3–6) containing Ardel Polyarylate D-100 and 0.5, 1.0, 2.5 and 5.0 phr styrene N-phenylmaleimide (S/NPMI) copolymer (prepared in Example I), respectively, were separately melt mixed on a single screw extruder at 320° C. In all cases, relative viscosity after extrusion, Tg, melt index, output rate and apparent viscosity versus shear rate where measured. All data are shown in following Table I.

TABLE I

| | Example No. | | | | |
|---|---|---|---|---|---|
| | 2 (Control) | 3 | 4 | 5 | 6 |
| Polyarylate resin* | 100 | 100 | 100 | 100 | 100 |
| S/NPMI (phr) | 0 | 0.5 | 1.0 | 2.5 | 5.0 |
| η r(CHCl₃, 25° C.) | 5.6 | 5.25 | 5.25 | 5.18 | 5.17 |
| Tg (°C., DSC) | 190 | 191 | 190.5 | 190.5 | 190.5 |
| Melt Index (310° C., g/10 min) | 3.8 | 6.3 | 8.4 | 10.2 | 14.8 |
| Output Rate (lbs/hour) | 3.1 | 8.1 | — | — | 7.2 |
| η app (poise) at γ (sec⁻¹) | | | | | |
| 29 | 9120 | 2680 | 3050 | 3650 | 4740 |
| 100 | 7742 | 1400 | 1750 | 1970 | 2680 |
| 1500 | 2100 | 1400 | 1410 | 1450 | 1500 |

*Ardel Polyarylate D-100 (Union Carbide)

The above five compositions were molded into test specimens using a Battenfeld injection molding machine and subjected to physical property testing. The physical tests conducted and the property values obtained for each composition are shown in following Table II.

TABLE II

| | Example No. | | | | |
|---|---|---|---|---|---|
| | 2 (Control) | 3 | 4 | 5 | 6 |
| Ardel D-100 | 100 | 100 | 100 | 100 | 100 |
| S/NPMI (phr) | 0 | 0.5 | 1.0 | 2.5 | 5.0 |
| Transparent | yes | yes | yes | yes | yes |
| Tensile str[1] (psi) | 9620 | 9760 | 10,170 | 9960 | 9930 |
| Flex str[2] (psi) | 12,520 | 13,615 | 12,500 | 12,820 | 12,960 |
| Flex mod[3] (psi) | 294,000 | 337,690 | 301,000 | 302,400 288,000 | |
| DTUL[4] (⅛″ °F.) | 322 | 325 | 326 | 323 | 322 |
| Elongation[5] (%) | 47 | 44 | 47 | 42 | 42 |
| Notched Izod[6] (ft-lbs/in) | 4.2 | 3.8 | 3.7 | 3.8 | 3.1 |
| GFWI[7] (in-lbs) | 416 | 480+ | 480+ | 416 | 420 |
| Flammability (UL-94, 1/16″) | V-0 | V-0 | V-0 | V-0 | V-0 |

[1]ASTM D-638
[2]ASTM D-790
[3]ASTM D-790
[4]ASTM D-648
[5]ASTM D-638
[6]ASTM D256
[7]1¼″ diameter orifice; 8 pound ½″ diameter weight

EXAMPLE 7–9

The following set of three examples serves to illustrate the increased hydrolytic stability of blends of polyarylate resins and styrene/N-phenylmaleimide copolymers. All data are set forth in following Table III.

TABLE III

| | Example No. | | |
|---|---|---|---|
| | 7 (Control) | 8 | 9 |
| Ardel Polyarylate D-100 (wt %) | 100 | 95 | 91 |
| S/NPMI (wt %) | 0 | 5 | 9 |
| Tensile strength (psi)(prior to immersion in boiling water) | 9620 | 9760 | 9980 |
| Tensile strength (psi)(after immersion) for: | | | |
| 1 week | 5400 | 9200 | 9610 |
| 2 weeks | 4300 | 9050 | 9560 |
| 3 weeks | 3600 | 9100 | 9300 |

It will be evident from the foregoing that various modifications can be made to this invention. Such, however, are considered as being within the scope of the invention.

What is claimed is:

1. A moldable polymer composition comprising from about 99.5 to about 1% by weight of a polyarylate resin derived from a dihydric phenol and a mixture of isophthalic acid and terephthalic acid and from about 0.5 to about 99% by weight of a copolymer containing from about 50 to about 60 mole % recurring units of a vinyl aromatic monomer and from about 40 to about 50 mole % recurring units of a maleimide monomer, said copolymer being thermodynamically miscible with said polyarylate resin.

2. The polymer composition of claim 1 in which said maleimide monomer is an N-substituted maleimide monomer.

3. The polymer composition of claim 2 in which said maleimide monomer is N-phenylmaleimide.

4. The polymer composition of claim 1 in which said copolymer has a peak molecular weight of from about 50,000 to about 500,000.

5. The polymer composition of claim 1 in which said copolymer is styrene/N-phenylmaleimide.

6. A method of producing a molded polymer composition which comprises forming a blend comprising from about 99.5 to about 1% by weight of a polyarylate resin derived from a dihydric phenol and a mixture of isophthalic acid and terephthalic acid and from about 0.5 to about 99% by weight of a copolymer containing from about 50 to about 60 mole % recurring units of a vinyl aromatic monomer and from about 40 to about 50 mole % recurring units of a maleimide monomer, and molding the resulting blend.

7. The method of claim 7 in which which said maleimide monomer is an N-substituted maleimide monomer.

8. The method of claim 6 in which said maleimide monomer is N-phenylmaleimide.

9. The method of claim 6 in which said copolymer has a peak molecular weight of from about 50,000 to about 500,000.

10. A method of improving the hydrolytic stability of a polyarylate resin derived from a dihydric phenol and a mixture of isophthalic acid and terephthalic acid upon molding which comprises incorporating into the polyarylate resin a copolymer containing from about 50 to about 60 mole % recurring units of a vinyl aromatic monomer and from about 40 to about 50 mole % recurring units of a maleimide monomer, the copolymer being present in the polyarylate resin in an amount sufficient to improve the hydrolytic stability of the polyarylate resin upon molding.

11. The method of claim 10 in which said maleimide monomer is an N-substituted maleimide monomer.

12. The method of claim 10 in which said maleimide monomer is N-phenylmaleimide.

13. The method of claim 10 in which said copolymer is styrene/N-phenylmaleimide.

14. A method of reducing the melt viscosity of a polyarylate resin derived from a dihydric phenol and a mixture of isophthalic acid and terephthalic acid which comprises incorporating into the polyarylate resin a copolymer containing from about 50 to about 60 mole % recurring units of a vinyl aromatic monomer and from about 40 to about 50 mole % recurring units of a maleimide monomer, the copolymer being present in the polyarylate resin in an amount sufficient to reduce the melt viscosity of the polyarylate resin upon molding.

15. The method of claim 14 in which said maleimide monomer is an N-substituted maleimide monomer.

16. The method of claim 14 in which said maleimide monomer is N-phenylmaleimide.

17. The method of claim 14 in which said copolymer is styrene/N-phenylmaleimide.

18. A molded article produced by molding the polymer composition of claim 1.

* * * * *